United States Patent [19]
Neff

[11] Patent Number: 5,609,687
[45] Date of Patent: Mar. 11, 1997

[54] NOZZLE FOR COUPLING ELECTROMAGNETIC ENERGY AND HEATABLE COMPOSITION

[75] Inventor: Craig A. Neff, Golden, Colo.

[73] Assignee: AST Holding, Ltd., Arvada, Colo.

[21] Appl. No.: 308,439

[22] Filed: Sep. 19, 1994

Related U.S. Application Data

[63] Continuation-in-part of Ser. No. 10,859, Jan. 29, 1993, Pat. No. 5,348,604.

[51] Int. Cl.⁶ .................................................. B05B 5/00
[52] U.S. Cl. .................... 118/641; 118/620; 222/146.2; 156/379.6; 156/578
[58] Field of Search .................................. 118/620, 641; 222/113, 146.2, 593; 239/132, 133, 135

[56] References Cited

U.S. PATENT DOCUMENTS

5,043,548  8/1991  Whitney et al. .
5,348,604  9/1994  Neff .

*Primary Examiner*—David A. Simmons
*Assistant Examiner*—M. Curtis Mayes
*Attorney, Agent, or Firm*—Dickinson, Wright, Moon, Van Dusen & Freeman

[57] ABSTRACT

A nozzle for application of an extrudable material to a substrate optically couples an electromagnetic beam to the extrudable material. The nozzle forms a flow channel with a window at one end. The extrudable material is admitted to the flow channel such that it flows across the bottom surface of the window and through the flow channel. The nozzle is removably held in a head to permit replacement of the nozzle when worn or for installation of a nozzle having different characteristics for a different application.

10 Claims, 2 Drawing Sheets

NOZZLE FOR COUPLING ELECTROMAGNETIC ENERGY AND HEATABLE COMPOSITION

CROSS REFERENCE TO PRIOR APPLICATIONS

This application is a continuation in part of U.S. application Ser. No. 08/010,859, filed on Jan. 29, 1993, now U.S. Pat. No. 5,398,604, the disclosure of which is incorporated herein.

TECHNICAL FIELD

This invention relates to the application of extrudable substances to a substrate. In particular, the invention relates to a nozzle for coupling the extrudable substance to a high power beam of electromagnetic energy, such as a laser beam.

BACKGROUND

U.S. application Ser. No. 08/010,859, now U.S. Pat. No. 5,348,604, describes a system for the application of an extrudable substance onto a substrate while the substance is coupled during extrusion with a beam of electromagnetic radiation from a laser. The extrudable substance is typically a polyamide hot melt adhesive, and the light is supplied by a 150 watt YAG laser. The substance is extruded through a small nozzle that has an inlet to a flow channel at one end and an exit at an opposite end. The light beam is coupled to the material in the flow channel by directing the beam through a window at one end and along the longitudinal axis of the nozzle. If the beam is not properly coupled into the extrudable material, the energy can be absorbed by the nozzle or the window, which substantially reduces the lifetime of those elements.

SUMMARY OF THE INVENTION

A nozzle in accordance with the invention is held in a housing such that it can be replaced if worn or if a different nozzle is to be used. The nozzle has a first portion that forms a flow channel, the channel having an inlet and an outlet. The outlet is generally a circular opening at one end of the nozzle, but it may be any of several shapes depending on the application. The other end of the flow channel includes an optical coupler that admits the electromagnetic beam to the flow channel. In the preferred embodiment, the optical coupler forms the uppermost end of the flow channel.

In addition to admitting the fluid composition to the flow channel, the inlet is positioned to ensure that the fluid composition contacts the optical coupler such that the fluid composition absorbs excess heat in the coupler. Thus, a plurality of inlets are placed with respect to the coupler such that they cause the fluid to sweep across the lower face of the coupler to prevent the formation of a static film of the fluid.

In one embodiment, the inlet comprises a series of radially directed grooves that communicate with the channel carrying the composition from a pump. In another embodiment, the grooves have tangential components such that the fluid swirls across the lower face of the coupler to increase the conductive and convective transfer of energy between the coupler and the fluid.

DETAILED DESCRIPTION OF THE PREFERRED EMBODIMENT

Figure 1:
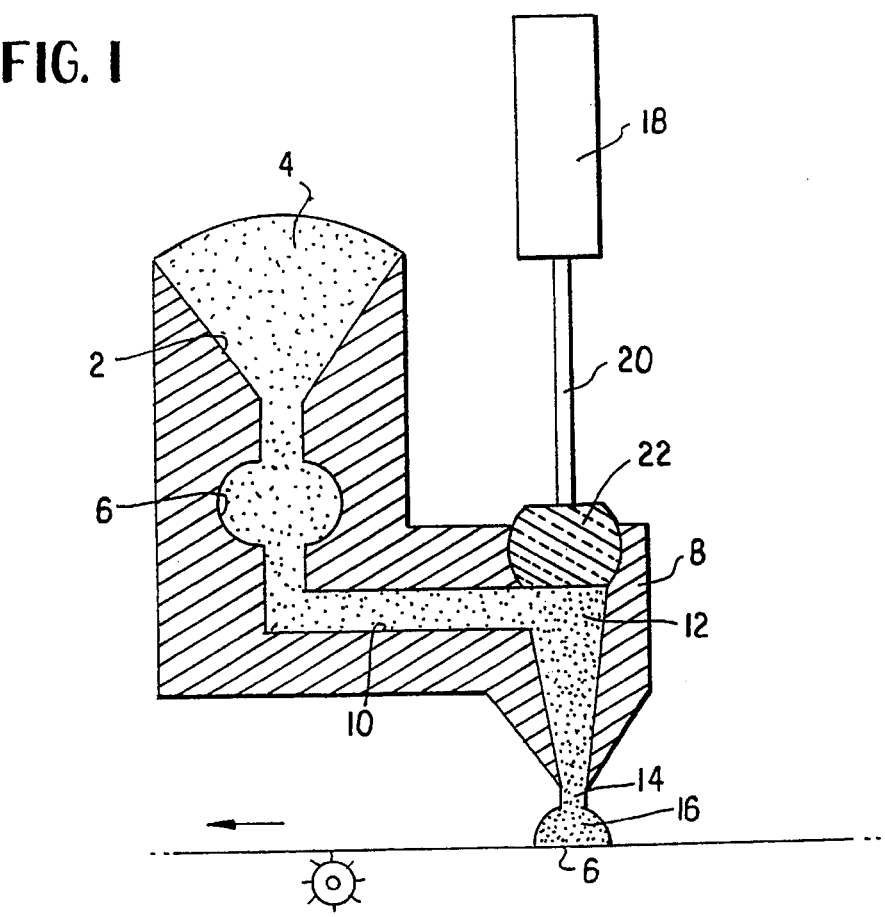
FIG. 1 is a vertical cross section through a system in accordance with the invention.

FIG. 1 shows a system substantially as shown in my earlier application referenced above. That system includes a reservoir 2 of extrudable material 4. A pump 6 supplies the extrudable material 4 to a nozzle 8 through a flow path 10. The material enters the flow channel 12 of the nozzle at an upper end thereof and exits the flow channel through an orifice 14 to form a bead of material 16 on a substrate.

The material in the nozzle is coupled to electromagnetic energy from a laser 18. The beam 20 from the laser is coupled to the material in the flow channel through a window 22.

Figure 2:
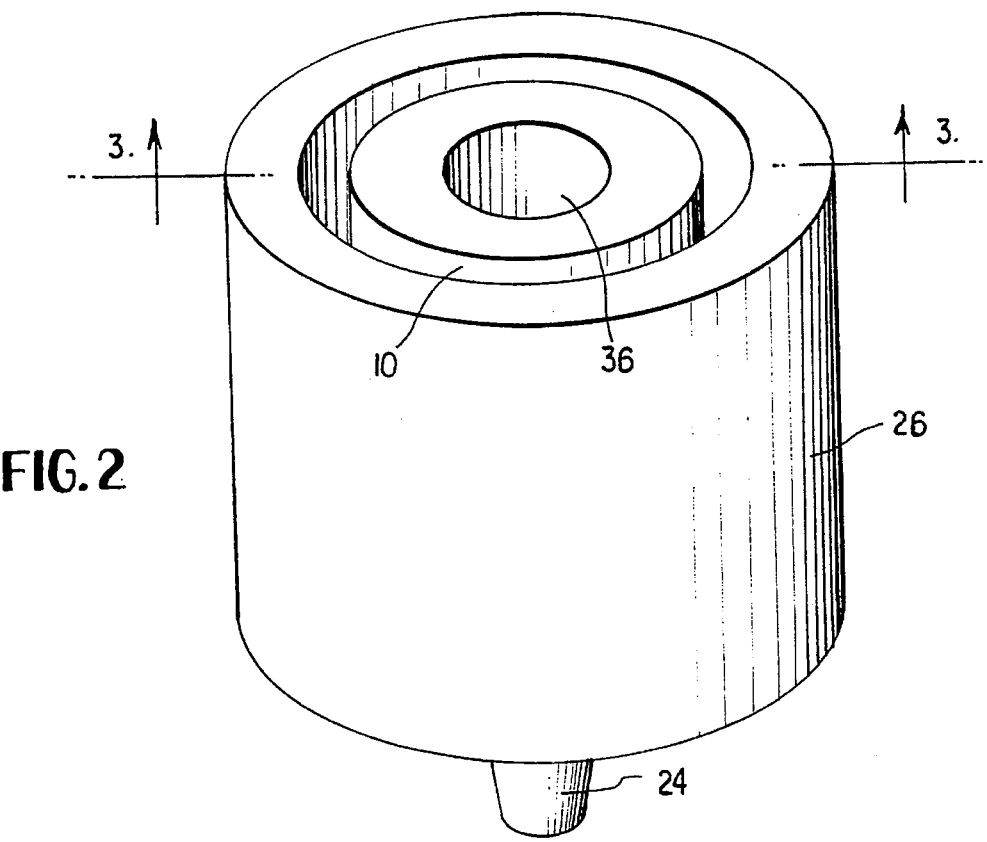
FIG. 2 is a perspective of a nozzle head in accordance with the invention.
Figure 3:
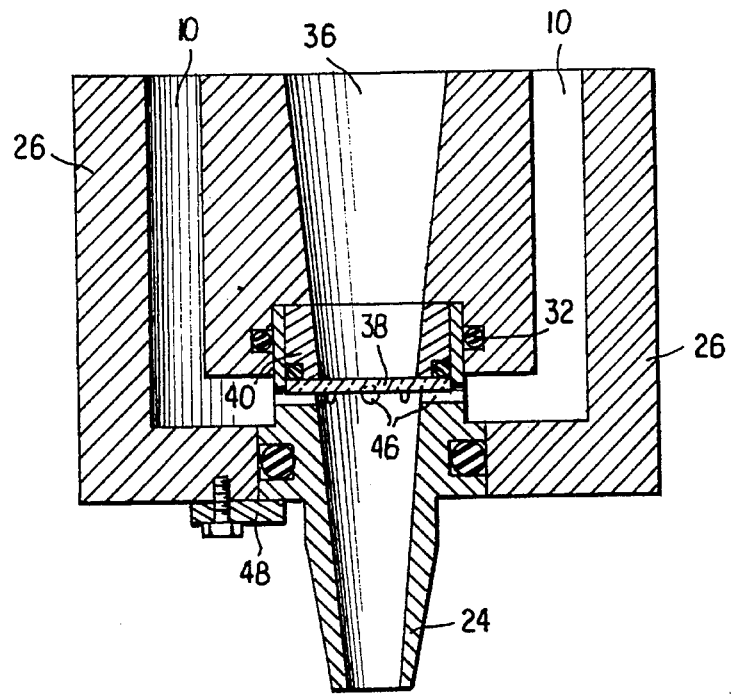
FIG. 3 is a vertical cross section of the nozzle head of FIG. 2.
Figure 4:
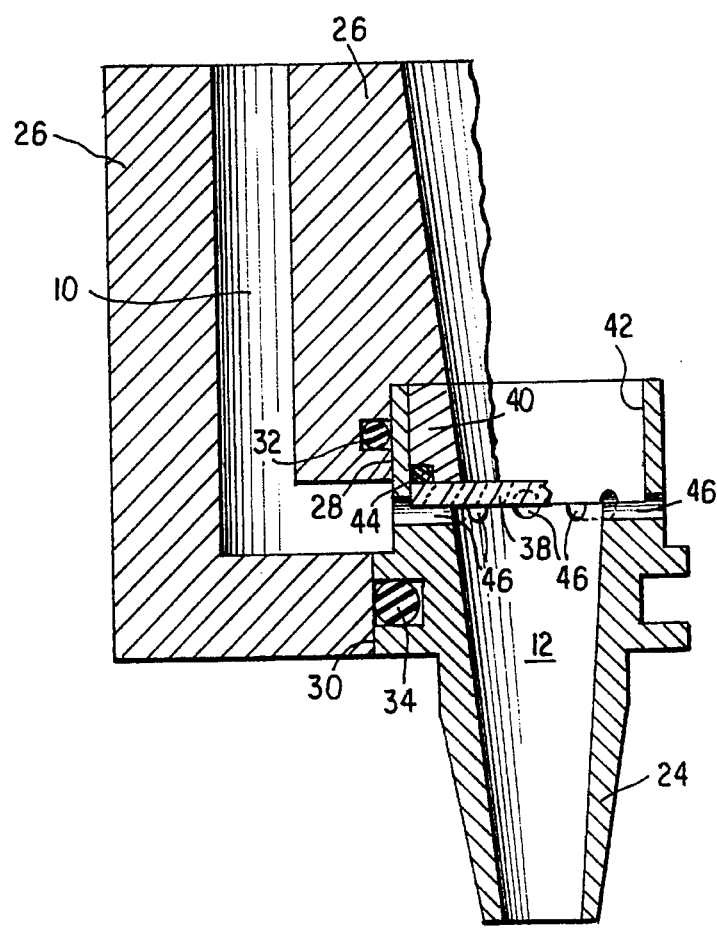
FIG. 4 is an enlarged partial cross section of the nozzle head of FIG. 2.

With reference now to FIGS. 2 through 4, a removable nozzle 24 is held in a head 26. The construction of the nozzle and head are shown in detail in FIGS. 3 and 4.

The head 26 includes flow path 10 for receiving the material from the pump as described with respect to FIG. 1. In this case, however, the flow path 10 completely surrounds the upper end of the nozzle. The nozzle 24 is received in two openings in the head. The first opening 28 is on the upper side of the flow path 10 and receives an upper part of the nozzle. The second opening 30 is on the bottom of the head and receives a lower part of the nozzle. An O-ring 32 is located in a groove in the head to form a seal between the head and the upper part of the nozzle, and an O-ring 34 is located in a groove in the nozzle to form a seal between the head and the lower part of the nozzle.

The head has a centrally located opening 36 for allowing the beam 20 to be directed onto the upper end of the nozzle.

The nozzle includes an optical window 38 for coupling the beam to the material 12. The window is held in the nozzle by a collar 40 that fits within a cylindrical recess 42. The window rests on the top edge of the flow channel and is shown in FIGS. 3 and 4 broken away. In practice the window completely covers the top of the flow channel. A third O-ring 44 engages both the recess 42 and the top of the window to form a seal.

The material is admitted to the flow channel 12 by a plurality of inlets, which are evenly spaced about the flow channel. The inlets 46 can be radially directed. Preferably they have a tangential component, however. The inlets are placed close to the bottom of the window whereby the material flows across the bottom of the window and carries away excess heat in the window. Provision of a tangential component ensures that no static film forms that would prevent efficient heat transfer between the material and the window. Thus, the window is kept cool, which increases its lifetime.

In the preferred embodiment, the inlets 46 are formed by semi-cylindrical grooves, and the window completes the channel. By this construction, the lower surface of the window is constantly swept by the incoming fluid material.

The nozzle 24 is preferably retained in the head by a mechanism such as plate 48, which is secured to the head, for example, by a bolt.

Optically, the window 38 is chosen to have essentially the same index of refraction as that of the extrudable material to reduce reflections. In addition, both sides of the window should be provided with an anti-reflection coating. Preferred materials for the window are the optical material BK7. Fused quartz and Pyrex materials are also useful.

It may be desirable, however, for the index of refraction of the coupler to differ from that of the material. For example, it is useful for the window to have optical power to shape the beam to a desired configuration. In this instance, the bottom of the coupler may be curved to provide optical power as a function of the index of refraction differential across the coupler-material interface.

The nozzle may be made of a variety of materials, including aluminum or steel. Aluminum is preferred because its thermal conductance maintains a higher temperature of the tip and because it is easily machined, thus reducing manufacturing costs.

It will be appreciated that a nozzle has been described that can efficiently couple electromagnetic energy to an extrudable material. The nozzle can, in some ways, be looked upon as a waveguide, as many waveguide principles are useful in the design of a nozzle. For example, coupling the laser beam to the material is made efficient by tuning the coupler to minimize reflection and absorption. Also, while impingement on the walls of the nozzle is generally to be avoided to reduce absorption and the formation of hot spots, reflections off the side walls of the nozzle can be used to advantage if those reflections are of the type used by waveguides to direct the energy along the path with minimum absorption by the walls.

Modifications within the scope of the appended claims will be apparent to those of skill in the art.

I claim:

1. A nozzle for application of a fluid composition to a substrate comprising flow channel means forming a flow channel for directing the flow of said fluid composition and optical coupler means at one end of said flow channel for admitting a beam of electromagnetic radiation to said flow channel, wherein said flow channel includes an inlet for admitting said fluid composition and an outlet for dispensing said fluid composition, said inlet is adjacent said optical coupler, and said inlet directs the flow of said fluid composition across said optical coupler.

2. A nozzle according to claim 1 wherein said optical coupler is oriented to direct said electromagnetic radiation along a longitudinal axis of said flow channel.

3. A nozzle according to claim 1 wherein said inlet directs the flow of said fluid composition such that said flow has a radial component with respect to the longitudinal axis of said flow channel.

4. A nozzle according to claim 3 wherein said inlet directs the flow of said fluid composition such that said flow has a tangential component with respect to the longitudinal axis of said flow channel.

5. A nozzle for application of a fluid composition to a substrate comprising flow channel means forming a flow channel for directing the flow of said fluid composition and optical coupler means at one end of said flow channel for admitting a beam of electromagnetic radiation to said flow channel, wherein said flow channel includes an inlet for admitting said fluid composition and an outlet for dispensing said fluid composition, said inlet is adjacent said optical coupler and said flow channel comprises a wall having an upper edge, said inlet comprises a groove in said upper edge, and said optical coupler engages said upper edge and forms a part of said inlet.

6. A nozzle according to claim 5 comprising a plurality of said grooves evenly spaced about said upper edge with respect to said longitudinal axis.

7. A nozzle for application of a fluid composition to a substrate comprising flow channel means forming a flow channel for directing the flow of said fluid composition and optical coupler means forming one end of said flow channel for admitting a beam of electromagnetic radiation to said flow channel, wherein said flow channel means forms a flow channel inlet adjacent said optical coupler for admitting said fluid composition and a flow channel outlet for dispensing said fluid composition and said nozzle further comprises means for removable engagement of a supporting head and means for aligning automatically a flow path in said head with said flow channel for fluid connection therewith and for sealing said nozzle to said supporting head when said nozzle is engaged in said supporting head.

8. A nozzle according to claim 6 wherein said flow channel is radially symmetric and said flow channel inlet comprises a plurality of inlets evenly spaced about said flow path.

9. A nozzle according to claim 8 wherein said means for removable engagement comprises means for sliding reception in a cylindrical opening in said supporting head.

10. A nozzle according to claim 9 in further combination with said supporting head.

\* \* \* \* \*